(12) United States Patent
Bakos et al.

(10) Patent No.: US 11,365,578 B2
(45) Date of Patent: Jun. 21, 2022

(54) POWERED HINGE ASSEMBLY FOR VEHICLE DOORS

(71) Applicant: Ford Global Technologies, LLC, Dearborn, MI (US)

(72) Inventors: Tracy Christopher Bakos, Commerce, MI (US); Suresh Narayan, Pinckney, MI (US); Kristopher Karl Brown, Dearborn, MI (US); Paul Repp, Plymouth, MI (US); Larry Dean Elie, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 16/555,055

(22) Filed: Aug. 29, 2019

(65) Prior Publication Data
US 2021/0062566 A1 Mar. 4, 2021

(51) Int. Cl.
*E05F 15/70* (2015.01)
*B60J 5/04* (2006.01)
*E05F 15/614* (2015.01)

(52) U.S. Cl.
CPC .............. *E05F 15/70* (2015.01); *B60J 5/047* (2013.01); *E05F 15/614* (2015.01); *E05Y 2201/434* (2013.01); *E05Y 2900/531* (2013.01)

(58) Field of Classification Search
CPC ....... E05F 15/611; E05D 5/062; E05D 5/0207
See application file for complete search history.

(56) References Cited

U.S. PATENT DOCUMENTS

| 2,721,353 A | 10/1955 | Mackintosh |
| 2,915,777 A | 12/1959 | Allen |
| 3,344,554 A | 10/1967 | Misaka et al. |

(Continued)

FOREIGN PATENT DOCUMENTS

| CA | 2034320 C | 11/1994 |
| CN | 101403271 A | 4/2009 |

(Continued)

OTHER PUBLICATIONS

Steeven Zeiß, Alexander Marinc, Andreas Braun, Tobias Große-Puppendahl, Sebastian Beck; "A Gesture-based Door Control Using Capacitive Sensors"; Fraunhofer-Institut für Graphische Datenverarbeitung IGD; pp. 1-10; date unknown.

(Continued)

*Primary Examiner* — Gregory J Strimbu
(74) *Attorney, Agent, or Firm* — Vichit Chea; Price Heneveld LLP (57) ABSTRACT

An automated door system includes a hinge assembly having a movable hinge portion coupled to a door and a fixed hinge portion coupled to a vehicle body at a hinge pillar. The movable hinge portion includes first and second mounting portions. The first mounting portion is rotatably connected to the fixed hinge portion for rotation about a hinge axis of the hinge assembly. A power assist device is coupled to the fixed hinge portion and further coupled to the second mounting portion of the movable hinge portion by a drive shaft. The power assist device includes a motor that is configured to drive the drive shaft for providing at least one of an opening and a closing movement of the door about the hinge axis of the hinge assembly.

20 Claims, 5 Drawing Sheets

(56) References Cited

U.S. PATENT DOCUMENTS

| | | |
|---|---|---|
| 3,357,137 A | 12/1967 | Lombardi et al. |
| 3,895,281 A | 7/1975 | Corbaz |
| 4,078,770 A | 3/1978 | Yates et al. |
| 4,143,497 A | 3/1979 | Offenbacher |
| 4,386,398 A | 5/1983 | Matsuoka et al. |
| 4,441,376 A | 4/1984 | Tobey |
| 4,488,753 A | 12/1984 | Koike |
| 4,497,137 A | 2/1985 | Nelson |
| 4,501,012 A | 2/1985 | Kishi et al. |
| 4,501,090 A | 2/1985 | Yoshida et al. |
| 4,674,230 A | 6/1987 | Takeo et al. |
| 4,727,679 A | 3/1988 | Kombrekke et al. |
| 4,763,111 A | 8/1988 | Matsuo et al. |
| 4,899,945 A | 2/1990 | Jones |
| 4,952,080 A | 8/1990 | Boiucaner et al. |
| 5,236,234 A | 8/1993 | Norman |
| 5,317,835 A | 6/1994 | Dupuy et al. |
| 5,355,628 A | 10/1994 | Dranchak |
| 5,369,911 A | 12/1994 | Fortunato |
| 5,396,158 A | 3/1995 | Long et al. |
| 5,434,487 A | 7/1995 | Long et al. |
| 5,787,636 A | 8/1998 | Buchanan, Jr. |
| 5,801,340 A | 9/1998 | Peter |
| 5,913,763 A | 6/1999 | Beran et al. |
| 6,065,185 A | 5/2000 | Breed et al. |
| 6,145,354 A | 11/2000 | Kondo et al. |
| 6,247,271 B1 | 6/2001 | Fioritto et al. |
| 6,275,231 B1 | 8/2001 | Obradovich |
| 6,305,737 B1 | 10/2001 | Corder et al. |
| 6,341,807 B2 | 1/2002 | Cetnar et al. |
| 6,370,732 B1 | 4/2002 | Yezersky et al. |
| 6,401,392 B1 | 6/2002 | Yuge |
| 6,435,575 B1 | 8/2002 | Pajak et al. |
| 6,442,902 B1 | 9/2002 | Van Den Oord |
| 6,498,970 B2 | 12/2002 | Colmenarez et al. |
| 6,624,605 B1 | 9/2003 | Powder et al. |
| 6,777,958 B2 | 8/2004 | Haag et al. |
| 6,928,694 B2 | 8/2005 | Breed et al. |
| 7,034,682 B2 | 4/2006 | Beggs et al. |
| 7,045,764 B2 | 5/2006 | Beggs et al. |
| 7,068,146 B2 | 6/2006 | Sasaki et al. |
| 7,132,642 B2 | 11/2006 | Shank et al. |
| 7,175,227 B2 | 2/2007 | Menard |
| 7,193,509 B2 | 3/2007 | Bartels et al. |
| 7,215,529 B2 | 5/2007 | Rosenau |
| 7,273,207 B2 | 9/2007 | Studer |
| 7,280,035 B2 | 10/2007 | McLain et al. |
| 7,320,497 B2 | 1/2008 | Zinn et al. |
| 7,342,373 B2 | 3/2008 | Newman et al. |
| 7,377,557 B2 | 5/2008 | Shelley et al. |
| 7,400,153 B2 | 7/2008 | Shoji et al. |
| 7,438,346 B1 | 10/2008 | Breed |
| 7,439,632 B2 | 10/2008 | Ogino et al. |
| 7,538,506 B2 | 5/2009 | Zinn et al. |
| 7,540,554 B2 | 6/2009 | Bals |
| 7,686,378 B2 | 3/2010 | Gisler et al. |
| 7,688,179 B2 | 3/2010 | Kurpinski et al. |
| 7,748,768 B2 * | 7/2010 | Hofacker ............... E05D 5/121 296/146.11 |
| 7,874,609 B2 | 1/2011 | Whinnery |
| 7,886,409 B2 | 2/2011 | Yip |
| 8,077,022 B2 | 12/2011 | Baruco et al. |
| 8,132,844 B2 | 3/2012 | Sonnek et al. |
| 8,159,231 B2 | 4/2012 | Sakamaki |
| 8,169,317 B2 | 5/2012 | Lemerand et al. |
| 8,186,013 B2 | 5/2012 | Yip |
| 8,237,544 B2 | 8/2012 | Nakashima |
| 8,284,022 B2 | 10/2012 | Kachouh |
| 8,397,581 B2 | 3/2013 | Ruby, III et al. |
| 8,511,739 B2 | 8/2013 | Brown et al. |
| 8,615,927 B2 | 12/2013 | Ezzat et al. |
| 8,641,125 B2 | 2/2014 | Jimenez et al. |
| 8,651,461 B2 | 2/2014 | Christensen et al. |
| 9,676,256 B2 * | 6/2017 | Elie ....................... B60J 5/047 |
| 9,783,027 B1 | 10/2017 | Elie et al. |
| 9,834,974 B2 | 12/2017 | Elie et al. |
| 9,879,465 B2 * | 1/2018 | Elie ....................... B60J 5/047 |
| 9,890,576 B2 * | 2/2018 | Elie ....................... B60R 16/03 |
| 10,030,431 B2 * | 7/2018 | Elie ....................... E05F 15/70 |
| 10,145,165 B2 * | 12/2018 | Elie ....................... E05F 15/60 |
| 10,240,386 B2 | 3/2019 | Wise |
| 10,301,863 B2 | 5/2019 | Azzouz et al. |
| 10,392,849 B2 | 8/2019 | Xiao et al. |
| 10,626,657 B2 * | 4/2020 | Elie ....................... B60J 5/047 |
| 10,661,837 B2 * | 5/2020 | Madsen ................ B62D 27/02 |
| 10,787,847 B2 * | 9/2020 | Elie ....................... E05D 5/062 |
| 10,801,246 B2 * | 10/2020 | Elie ....................... E05F 15/614 |
| 10,995,535 B2 * | 5/2021 | Elie ....................... B60J 5/047 |
| 2001/0004164 A1 | 6/2001 | Mattsson |
| 2002/0039008 A1 | 4/2002 | Edgar et al. |
| 2003/0038544 A1 | 2/2003 | Spurr |
| 2003/0102692 A1 * | 6/2003 | Mooy .................... E05D 5/062 296/146.11 |
| 2003/0222758 A1 | 12/2003 | Willats et al. |
| 2005/0174077 A1 | 8/2005 | Haag et al. |
| 2005/0242618 A1 | 11/2005 | Menard |
| 2005/0280284 A1 | 12/2005 | McLain et al. |
| 2006/0230574 A1 | 10/2006 | Murayama et al. |
| 2007/0090654 A1 | 4/2007 | Eaton |
| 2007/0186480 A1 | 8/2007 | Freeman |
| 2007/0192038 A1 | 8/2007 | Kameyama |
| 2008/0211519 A1 | 9/2008 | Kurumado et al. |
| 2008/0295408 A1 | 12/2008 | Heissler |
| 2008/0296927 A1 | 12/2008 | Gisler et al. |
| 2009/0113797 A1 | 5/2009 | Hoermann |
| 2009/0153151 A1 | 6/2009 | Cho et al. |
| 2010/0224117 A1 | 9/2010 | Christensen et al. |
| 2011/0203181 A1 | 8/2011 | Magner et al. |
| 2011/0260848 A1 | 10/2011 | Rodriguez Barros et al. |
| 2011/0295469 A1 | 12/2011 | Rafii et al. |
| 2012/0042572 A1 | 2/2012 | Yuge |
| 2012/0179336 A1 | 7/2012 | Oakley |
| 2013/0031747 A1 | 2/2013 | Gobart et al. |
| 2013/0074412 A1 | 3/2013 | Wellborn et al. |
| 2013/0091768 A1 | 4/2013 | Houser et al. |
| 2013/0127479 A1 | 5/2013 | Grills et al. |
| 2013/0138303 A1 | 5/2013 | McKee et al. |
| 2014/0000165 A1 | 1/2014 | Patel et al. |
| 2014/0055349 A1 | 2/2014 | Itoh |
| 2014/0150581 A1 | 6/2014 | Scheuring et al. |
| 2014/0297060 A1 | 10/2014 | Schmidt et al. |
| 2014/0373454 A1 | 12/2014 | Sasaki |
| 2015/0059250 A1 * | 3/2015 | Miu ....................... E05F 15/614 49/349 |
| 2017/0074020 A1 | 3/2017 | Azzouz et al. |
| 2018/0066466 A1 | 3/2018 | Elie et al. |
| 2018/0245390 A1 | 8/2018 | Elie et al. |

FOREIGN PATENT DOCUMENTS

| | | |
|---|---|---|
| CN | 201343938 Y | 11/2009 |
| CN | 202294674 U | 7/2012 |
| CN | 103132847 A | 6/2013 |
| CN | 103269914 A | 8/2013 |
| CN | 203143980 U | 8/2013 |
| CN | 103422764 A | 12/2013 |
| CN | 203551964 U | 4/2014 |
| CN | 203580775 U | 5/2014 |
| DE | 4119579 A1 | 12/1992 |
| DE | 4207706 A1 | 9/1993 |
| DE | 10004161 A1 | 8/2001 |
| DE | 10038803 A1 | 2/2002 |
| DE | 102007062473 A1 | 7/2009 |
| EP | 0397300 A2 | 11/1990 |
| EP | 2174814 A2 | 4/2010 |
| EP | 1265772 A1 | 12/2010 |
| EP | 2287430 A2 | 2/2011 |
| EP | 1899565 B1 | 10/2011 |
| EP | 2583848 A2 | 4/2013 |
| EP | 2765112 A1 | 8/2014 |
| FR | 2873074 A1 | 1/2006 |
| JP | 07285789 A | 10/1995 |
| JP | 2000080828 A | 3/2000 |
| JP | 2000318444 A | 11/2000 |

(56) References Cited

FOREIGN PATENT DOCUMENTS

| | | |
|---|---|---|
| JP | 2004176426 A | 6/2004 |
| JP | 2009161959 A | 7/2009 |
| JP | 20100095383 A | 4/2010 |
| JP | 2013007171 A | 1/2013 |
| JP | 2013028903 A | 2/2013 |
| JP | 2014129037 A | 7/2014 |
| JP | 2014148842 A | 8/2014 |
| KR | 20020048811 A | 6/2002 |
| KR | 20130068538 A | 6/2013 |
| WO | 20100098620 A2 | 9/2010 |
| WO | 2013013313 A1 | 1/2013 |
| WO | 2013074901 A2 | 5/2013 |

OTHER PUBLICATIONS

Abd Manan Bin Ahmad; "The Design and Development of a System for Controlling Automotive Functions using Speech Recognition"; Universiti Teknologi Malaysia; pp. 1-100; 2006.
Haleem, M.S.; "Voice Controlled Automation System"; IEEE International; Dept. of Electron. Eng., NED Univ. of Eng. & Technol.; Multitopic Conference; Print ISBN: 978-1-4244-2823-6; pp. 1-2; Dec. 23-24, 2008.
"InnoTrans 2014: Safety on Vehicle Doors with Non-Touch Detection System from Mayser"; Mayser Safety Technology; pp. 1-1; Aug. 4, 2014.
Bogdan Popa; "How BMW's Soft Close Doors Work"; Autoevolution; pp. 1-6; Aug. 18, 2012.

\* cited by examiner

POWERED HINGE ASSEMBLY FOR VEHICLE DOORS

FIELD OF THE INVENTION

The present invention generally relates to a device for use on an automotive vehicle door, and more particularly to a power assist device for the vehicle door providing opening and/or closing assistance for the door.

BACKGROUND OF THE INVENTION

Various powered vehicle doors have been developed. Known vehicle doors may provide for powered opening and/or closing of the vehicle door.

SUMMARY OF THE INVENTION

One aspect of the present invention is an automated door system including a door pivotally coupled to a vehicle body by at least one hinge assembly. The hinge assembly includes a movable hinge portion having a base coupled to the door and a fixed hinge portion coupled to the vehicle body at a hinge pillar. The movable hinge portion includes vertically spaced-apart upper and lower mounting portions extending from the base. The upper mounting portion is rotatably connected to the fixed hinge portion for rotation about a hinge axis of the hinge assembly. A power assist device is coupled to the fixed hinge portion and further coupled to the lower mounting portion of the mounting hinge portion by a drive shaft extending outwardly from the power assist device. The drive shaft rotates about a motor axis that is coaxial with the hinge axis. A motor is disposed within a power assist device and configured to drive the drive shaft for providing at least one of opening and closing movement of the door about the hinge axis of the hinge assembly.

Embodiments of the first aspect of the disclosure can include any one or a combination of the following features:

- The upper mounting portion of the mounting hinge assembly may be rotatably connected to the fixed hinge portion.
- The motor may include one of an electric motor, a power winch, an actuator, a servo motor, an electric solenoid, a pneumatic cylinder, and a hydraulic cylinder.
- The door may include an inner panel having a first sidewall with the base of the movable hinge portion coupled thereto.
- The motor may be configured to provide both opening and closing movement of the door.
- The base of the mounting hinge portion may comprise an upright web, and the upper and lower mounting portions may extend transversely from the upright web.
- The power assist device may be configured to move the door between a closed position and a plurality of open positions disposed along a door swing path.
- The power assist device may be configured to move the door to a predetermined detent position and retain the door at the detent position.
- The power assist device may be configured to provide a soft close feature for the door when an initial velocity of the door exceeds a threshold velocity in a door closing movement along a door swing path.
- The drive shaft may extend outwardly from a first end of the power assist device, and the power assist device may be coupled to the fixed hinge portion by a transverse plate.
- The fixed hinge portion may include a fixed based portion fixed to the vehicle body and a vertically spaced-apart upper and lower connecting portions extending transversely from the fixed base portion.
- The upper connecting portion may be rotatably connected to the upper mounting portion of the mounting hinge portion, and the lower connecting portion may be connected to the transverse plate.
- The hinge pillar may include spaced-apart inner and outer sidewalls, each having bolt-receiving openings therethrough. A compression tube may be disposed inside the hinge pillar with opposite ends abutting the inner and outer sidewalls around the bolt-receiving openings.
- An elongated bolt may extend through an opening in a fixed base portion of the fixed hinge portion, and through the bolt-receiving openings and through the compression tube. The elongated bolt may have an outer end engaging the fixed based portion of the fixed hinge portion and an inner end connected to an instrument panel compensator joint, where the elongated bolt secures the fixed hinge portion to the hinge pillar and simultaneously secures an instrument panel structure to the hinge pillar.
- The hinge pillar may have upper and lower ends, and the fixed hinge portion may be secured to the upper end of the hinge pillar.

Another aspect of the present disclosure is a motor vehicle including a body with at least one opening and an automated door system. The automated door system includes a door pivotally coupled to the vehicle body by upper and lower hinge assemblies to selectively close off the opening of the body. The upper hinge assembly includes a movable hinge portion having a base coupled to the door and a fixed hinge portion coupled to the vehicle at a hinge pillar. The movable hinge portion includes vertically spaced-apart upper and lower mounting portions. The upper mounting portion is rotatably connected to the fixed hinge portion for rotation about a hinge axis of the upper hinge assembly. A power assist device is coupled to the fixed hinge portion and further coupled to the lower mounting portion of the movable hinge portion by a drive shaft extending upwardly from the power assist device. A motor is disposed within a power assist device, and the motor is configured to drive the drive shaft for providing opening and closing movement of the door about the hinge axis of the hinge assembly.

Embodiments of the second aspect of the disclosure can include any one or a combination of the following features:

- The drive shaft may optionally rotate about a motor axis that is coaxial with the hinge axis.
- The upper mounting portion of the movable hinge portion may be rotatably connected to the fixed hinge portion via a hinge pin.
- The base of the mounting hinge portion may include an upright web, and the upper and lower mounting portions may extend transversely from the upright web.
- The drive shaft may optionally extend outwardly and upwardly from an upper end of the power assist device.
- The power assist device is optionally coupled to the fixed hinge portion by a plate that extends transverse relative to the motor axis.
- The fixed hinge portion may optionally include a fixed base portion that is fixed to the vehicle body.
- The fixed hinge portion may optionally include vertically spaced-apart upper and lower connecting portions extending transversely from the fixed base portion.
- The upper connecting portion may be rotatably connected to the upper mounting portion of the mounting hinge portion, and the lower connecting portion may be connected to the transverse plate.

Another aspect of the present disclosure is a motor vehicle comprising at least one opening and an automated door system. The automated door system includes a door pivotally coupled to the vehicle body by at least one hinge assembly. The hinge assembly includes a movable hinge portion having a base coupled to the door and a fixed hinge portion having a fixed base portion that is coupled to the vehicle body at the hinge pillar. The movable hinge portion includes vertically spaced-apart upper and lower mounting portions. The upper mounting portion is rotatably connected to the fixed hinge portion for rotation about a hinge axis of the hinge assembly. A power assist device is coupled to the fixed hinge portion and further coupled to the lower mounting portion of the movable hinge portion by a drive shaft extending outwardly from the power assist device. A motor is disposed within the power assist device. The motor is configured to drive the drive shaft for providing at least one of opening and closing movement of the door about the hinge axis of the hinge assembly. The hinge pillar may include spaced-apart inner and outer sidewalls, the inner sidewalls each having bolt-receiving openings therethrough. A compression tube has opposite ends abutting inner sides of the inner and outer sidewalls around the bolt-receiving openings. An elongated bolt extends through an opening in a fixed base portion of the fixed hinge portion and through the bolt-receiving openings and through the compression tube. The elongated bolt has an outer end of the elongated bolt that engages the fixed base portion of the fixed hinge portion. An inner end of the elongated bolt is connected to an instrument panel compensator joint. The elongated bolt secures the fixed hinge portion to the hinge pillar, and simultaneously secures an instrument panel structure to the hinge pillar.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
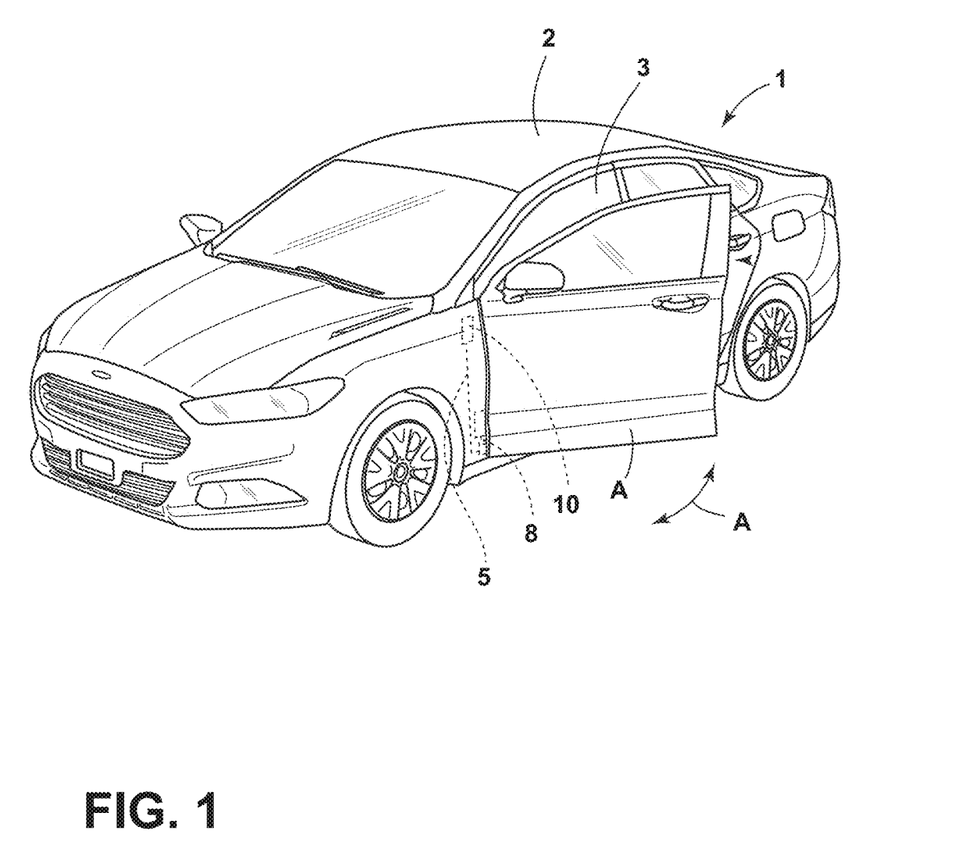
FIG. 1 is an isometric view of a vehicle having a powered door assembly according to one aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

This patent application is related to U.S. Pat. No. 9,834,974, issued on Dec. 5, 2017, entitled "AUTOMOTIVE DOOR POWER ASSIST," and U.S. Pat. No. 10,301,863, issued on May 28, 2019, entitled "MOUNTING AND ALIGNING A VEHICLE SIDE DOOR MOTOR WITHIN THE CURRENT BILL OF PROCESS." The entire contents of each of these patents are incorporated herein by reference.

With reference to FIG. 1, a motor vehicle 1 includes a body 2 having one or more door openings 3 that can be selectively closed off by one or more doors 4. Body structure 2 may include an upright hinge pillar 5, and door 4 may be pivotally connected to the hinge pillar 5 of body structure 2 by one or more hinges such as lower hinge 8 and upper hinge 10 to provide for opening and closing movement of door 4 as shown by the arrow "A." In a preferred embodiment, the lower hinge 8 comprises a conventional (non-powered) hinge assembly, and upper hinge assembly 10 comprises a powered hinge assembly as described in more detail below. However, it will be understood that the lower hinge assembly 8 may comprise a powered hinge, and upper hinge assembly 10 may comprise a conventional (non-powered) hinge assembly. Alternatively, both hinge assemblies 8 and 10 may comprise powered hinge assemblies.

Figure 2:
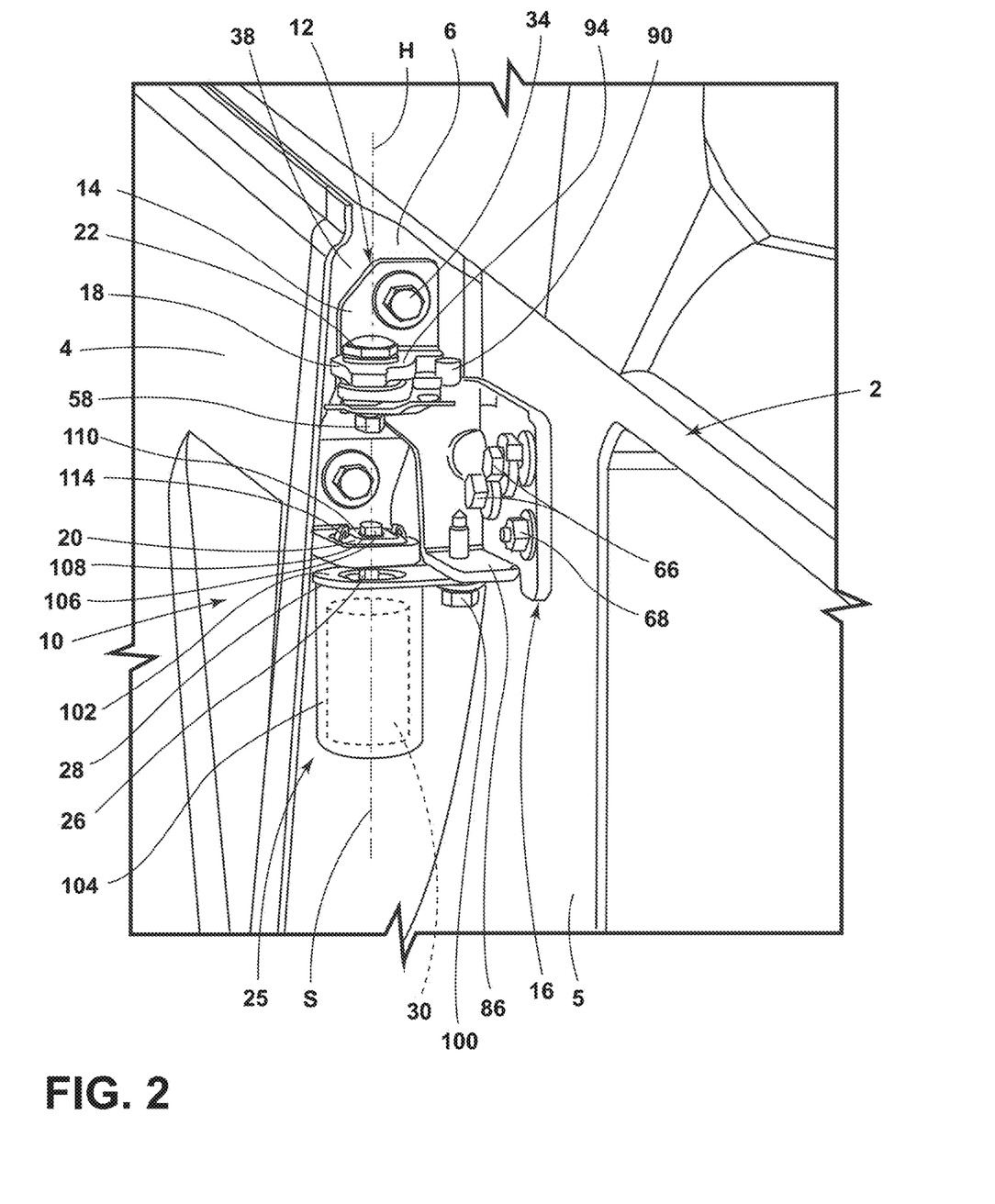
FIG. 2 is a partially fragmentary isometric view of an automated door system according to one aspect of the present disclosure.
Figure 3:
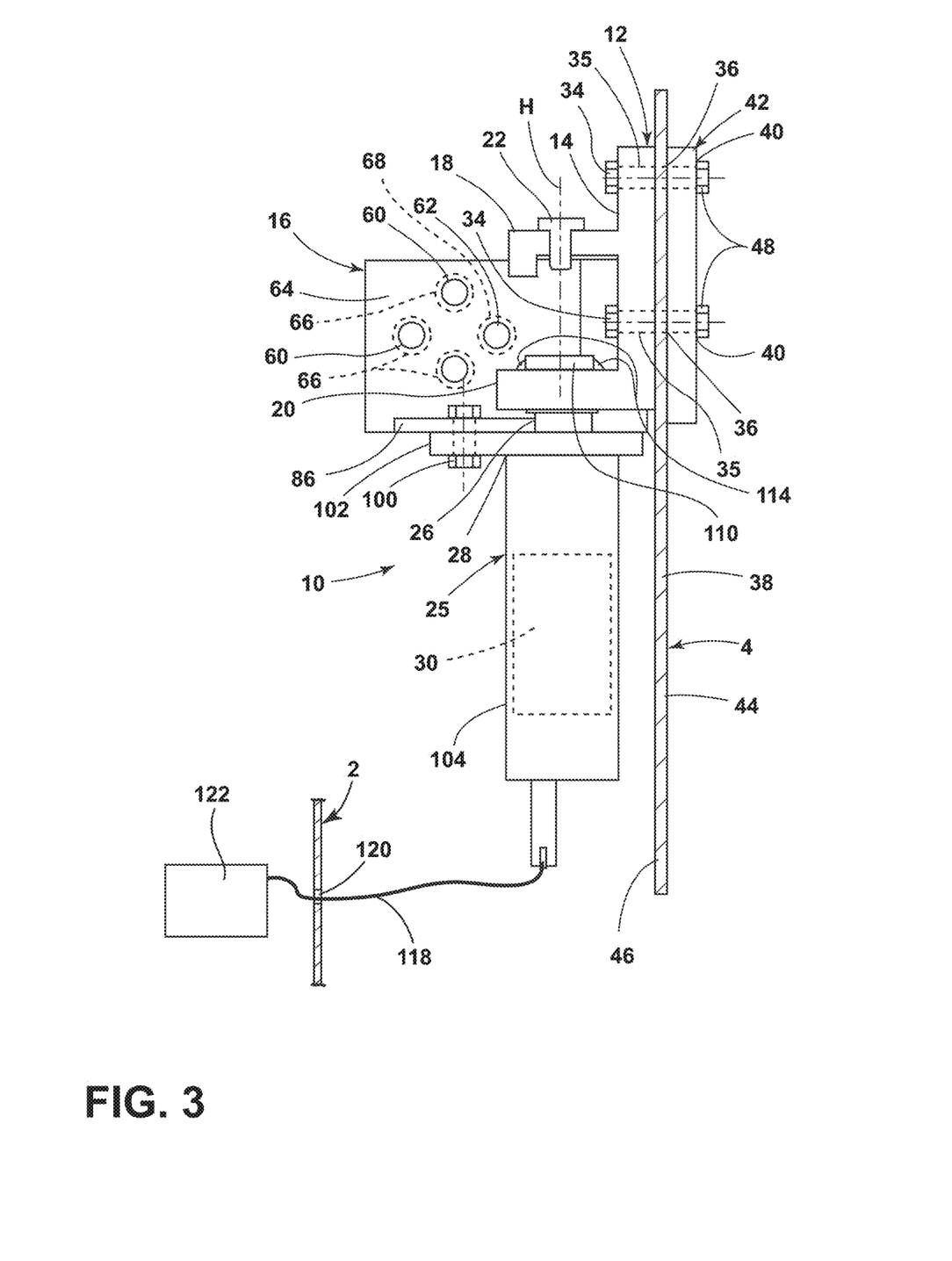
FIG. 3 is a partially schematic view of the door system of FIG. 2.
Figure 4:
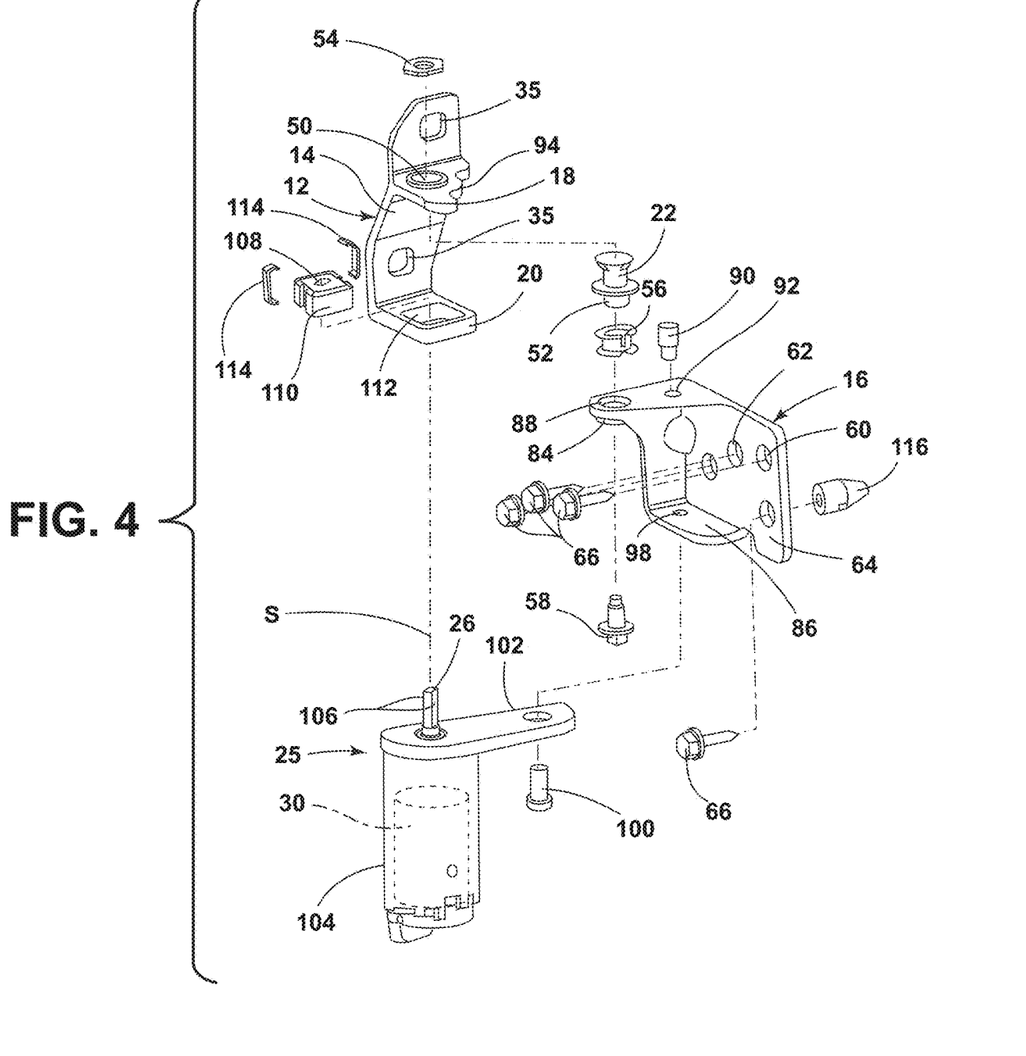
FIG. 4 is an exploded isometric view of the door assembly of FIG. 2.

With further reference to FIGS. 2-4, hinge assembly 10 includes a movable hinge portion 12 having a base 14 as coupled to a forward panel or plate 6 of the door 4. The hinge assembly 10 further includes a fixed hinge portion 16 that is coupled to the vehicle body 2 at hinge pillar 5. The movable hinge portion 12 includes vertically spaced-apart upper and lower mounting portions 18 and 20, respectively. The upper mounting portion 14 is rotatably connected to the fixed hinge portion 16 via a hinge pin 22 or other suitable arrangement for rotation about a hinge axis H of the hinge assembly 10. Hinge axis H is preferably upright (e.g. vertical). However, it will be understood that the present disclosure is not limited to this configuration.

The hinge assembly 10 further includes a power assist device 25 coupled to the fixed hinge portion 16 and further coupled to the lower mounting portion 20 of the movable hinge portion 12 by a drive shaft 26 extending outwardly from an end 28 of the power assist device 25. The drive shaft 26 rotates about a shaft "S" that is preferably coaxial with the hinge axis H. A motor 30 is disposed within the power assist device 25 and configured to drive (rotate) the drive shaft 26 for providing at least one of opening and closing movement of the door 4 about the hinge axis H of the hinge assembly 10. Motor 30 is preferably an electric motor that can rotate drive shaft 26 in opposite rotational directions, and selectively fix drive shaft 26 at a selected rotational position to thereby retain door 4 at a selected open or partially open position. However, motor 30 may optionally comprise one or more of a power winch, an actuator, a servo motor, an electric solenoid, a pneumatic cylinder, and a hydraulic cylinder.

The hinge assembly 10 and door 4 of the present disclosure may be configured to operate in substantially the same manner as the power assist of U.S. Pat. No. 9,834,974. For example, the hinge assembly 10 may be configured to slow movement of the door 4 along a door swing path from an initial velocity to a slow close velocity when the initial velocity exceeds a predetermined threshold velocity, thereby providing a slow and controlled close when a user attempts to slam the door 4. The hinge assembly 10 may further be configured to provide for powered opening and/or closing movement of the door as initiated by a user. In particular, the hinge assembly 10 may be configured to operate as discussed in connection with FIGS. 8-11 of U.S. Pat. No. 9,834,974. However, it will be understood that the operation of the hinge assembly 10 of the present disclosure is not necessarily limited to the operation of the automotive door power assist of U.S. Pat. No. 9,834,974.

Referring again to FIGS. 2-4, the base 14 of movable hinge portion 12 may include a plurality of openings 35 that receive threaded fasteners 34. Threaded fasteners 34 may comprise bolts that extend through openings 36 in door panel 38 (FIG. 3), and through openings 40 in a mounting plate 42 that is disposed on an inner side 44 of door panel 38 opposite an outer side 46 of door panel 38. Threaded nuts 48 or the like engage threaded fasteners 34 to thereby secure the movable hinge portion 12 to the door panel 38. Movable hinge portion 12 includes upper and lower mounting portions 18 and 20, respectively, that extend transversely from the base 14 of the movable hinge portion 12 (FIG. 4). Movable hinge portion 12 may comprise virtually any suitable material. In a preferred embodiment, movable hinge portion 12 comprises an integral one-piece forged steel structure.

The fixed hinge portion 16 includes a fixed base portion 64 that may be in the form of a generally upright web having a plurality of openings 60 therethrough that receive bolts 66 to secure the fixed hinge portion 16 to the hinge pillar 5. An optional alignment pin 116 may be received in an opening (not shown) in body structure 2 to align and position fixed hinge portion 16 relative to body structure 2. As discussed in more detail below, the fixed base portion 64 may optionally include an opening 62 that is configured to receive an elongated instrument panel ("IP") bolt 68 (FIG. 5).

Referring again to FIGS. 2-4, the fixed hinge portion 16 may include upper and lower connecting portions 84 and 86, respectively, that extend transversely from the fixed base portion 64. When the hinge assembly 10 is assembled, pivot 22, pivot washer 54, bushing 56, and pivot bolt 58 engage opening 50 in movable hinge portion 12 and opening 88 in fixed hinge portion 16 to thereby pivotally interconnect the movable hinge portion 12 and fixed hinge portion 16. The upper mounting portion 18 of movable hinge portion 12 is positioned above upper connecting portion 84 of fixed hinge portion 16 such that the weight of door 4 tends to cause the movable hinge portion 12 to push downwardly on upper connecting portion 84 of the fixed hinge portion 16. A stop pin 90 may be received in an opening 92 of fixed hinge portion 16. The stop pin 90 is configured to engage edge 94 of upper mounting portion 18 (see also FIG. 2) to thereby provide detents and/or limit travel of door 4 in an opening direction in a known manner.

The lower connecting portion 86 (FIG. 4) of fixed hinge portion 16 includes an opening 98 that receives a bolt 100 (see also FIG. 2). Bolt 100 secures a plate 102 of power assist device 25 to the fixed hinge portion 16. In particular, the plate 102 is rigidly fixed to upper end 28 of housing 104 of power assist device 25, and the bolt 100 therefore rigidly secures the housing 104 to the fixed hinge portion 16. It will be understood that some rotation of plate 102 about bolt 100 may be possible prior to tightening of bolt 100 (e.g., to provide adjustment during assembly). However, because bolt 100 is offset from axis S of drive shaft 26, bolt 100 prevents rotation of housing 104 of power assist device 25. End portion 106 (FIG. 4) of drive shaft 26 may have a non-circular cross sectional shape (e.g. cylindrical with flat surface 106 on opposite sides) that engages a corresponding non-circular opening 108 in a connector 110 such that the connector 110 is rotationally fixed relative to shaft 106 and rotates with shaft 106 and thereby transfers torque from shaft 26 to connector 110. The connector 110 may be received in a square or rectangular cavity or opening 112 (FIG. 4) of lower mounting portion 20 of movable hinge portion 12 such that connector 110 is rotationally fixed to hinge portion 12. Thus, drive shaft 26 of motor 30 is rotationally fixed to movable hinge portion 12. Clips 114 secure the connector 110 to the lower mounting portion 20 and drive shaft 26. Because housing 104 of power assist device 25 is secured to fixed hinge portion 16 and body 2, actuation of motor 30 causes shaft 26 to rotate relative to housing 104, and rotation of shaft 26 causes movable hinge portion 12 and door 4 to rotate about hinge axis H relative to body 2.

Figure 5:
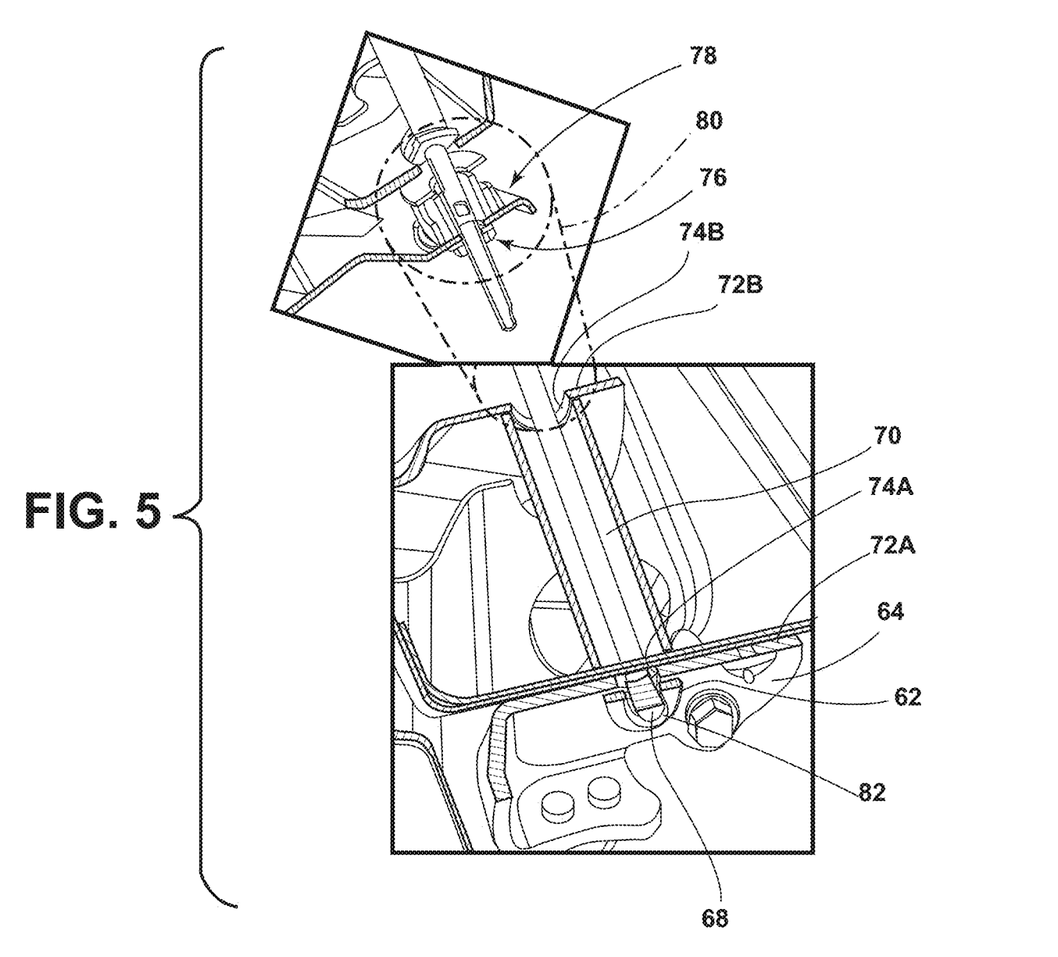
FIG. 5 is a partially fragmentary isometric view showing an optional through-bolt connector that integrates hinge attachment with an instrument panel compensator joint assembly.

With reference to FIG. 5, IP bolt 68 extends through a compression tube 70 and through openings 74A and 74B in opposite sidewalls 72A and 72B, respectively, of hinge pillar 5. The elongated IP bolt 68 has an inner end 76 that engages an instrument panel compensator joint 78. The elongated IP bolt 68 and instrument panel compensator joint 78 may be substantially similar to existing instrument panel components. These components interconnect the instrument panel components and cross beam structure 80 in a known manner. Although the elongated IP bolt 68 and instrument panel compensator joint 78 may be substantially similar to known components, the outer end 82 of IP bolt 68 bears against the fixed base portion 64 of fixed hinge portion 16 to thereby simultaneously clamp/support the instrument panel components and secure the fixed hinge portion 16 to the hinge pillar 5.

Referring again to FIG. 3, a plurality of electrical lines 118 may operably interconnect the power assist device 25 to a vehicle power and control system 122. The electrical lines 118 may extend through an opening 120 of vehicle body 2. The opening 120 may be sealed by grommets or other suitable pass-through feature (not shown). Because the power assist device 25 is secured to the fixed hinge portion 16 which is secured to the vehicle body 2, the power assist device 25 does not move relative to the vehicle body 2, and the electrical lines 118 do not move as door 4 opens and closes. However, electrical lines 118 may alternatively be routed through an opening in door panel 38. It will be understood that the vehicle power and control system 122 may include one or more control units or modules that are operably interconnected by one or more onboard networks in virtually any configuration as required for a particular application.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An automated door system, comprising:
   a door pivotally coupled to a vehicle body by at least one hinge assembly, the hinge assembly including a movable hinge portion having a base coupled to the door whereby the movable hinge portion moves with the door, the hinge assembly including a fixed hinge portion coupled to a hinge pillar of the vehicle body whereby the fixed hinge portion does not move relative to the vehicle body, wherein the movable hinge portion includes vertically spaced-apart upper and lower mounting portions extending horizontally from the base, wherein the upper mounting portion is directly above the lower mounting portion, and wherein the upper mounting portion is rotatably connected to the fixed hinge portion by a hinge pin received in an opening in the upper mounting portion of the movable hinge portion and in a first opening in the fixed hinge portion for rotation about a hinge axis of the hinge assembly;

a power assist device having a housing fixed to a transverse plate that is coupled to the fixed hinge portion by a bolt extending parallel to the hinge axis whereby a motor axis of the power assist device is rotatable about the bolt prior to tightening of the bolt, whereby the housing does not move relative to the fixed hinge portion when the bolt is tightened, and wherein the power assist device is coupled to the lower mounting portion of the movable hinge portion by a drive shaft extending outwardly from the power assist device, wherein the drive shaft is rotationally fixed to the lower mounting portion of the movable hinge portion such that the drive shaft, the movable hinge portion, and the door rotate together about the motor axis that is approximately coaxial with the hinge axis; and a motor disposed within the power assist device and configured to drive the drive shaft for providing at least one of an opening and a closing movement of the door about the hinge axis of the hinge assembly.

2. The automated door system of claim 1, wherein:
the base and the upper and lower mounting portions of the movable hinge portion comprise a-rigid one piece structure.

3. The automated door system of claim 1, wherein:
the motor includes one of an electric motor, a power winch, an actuator, a servo motor, an electric solenoid, a pneumatic cylinder, and a hydraulic cylinder.

4. The automated door system of claim 1, wherein:
an upper end of the drive shaft is spaced apart from a lower end of the hinge pin, such that the drive shaft is rotationally decoupled from the hinge pin.

5. The automated door system of claim 1, wherein:
the motor is configured to provide the opening and closing movements of the door.

6. The automated door system of claim 1, wherein:
the base of the movable hinge portion comprises an upright web, and the upper and lower mounting portions extend transversely from the upright web.

7. The automated door system of claim 1, wherein:
the power assist device is configured to move the door between a closed position and a plurality of open positions disposed along a door swing path.

8. The automated door system of claim 1, wherein:
the power assist device is configured to move the door to a predetermined detent position and retain the door at the detent position.

9. The automated door system of claim 1, wherein:
the power assist device is configured to limit a velocity of the door when an initial velocity of the door exceeds a threshold velocity during the door closing movement along a door swing path.

10. The automated door system of claim 1, wherein:
the drive shaft extends outwardly from an end of the power assist device through a first opening in the transverse plate;

the bolt extends through a second opening in the transverse plate and through a second opening in the fixed hinge portion.

11. The automated door system of claim 10, wherein:
the fixed hinge portion includes a fixed base portion fixed to the vehicle body and vertically spaced-apart upper and lower connecting portions extending transversely from the fixed base portion, wherein the upper connecting portion is rotatably connected to the upper mounting portion of the movable hinge portion, and the lower connecting portion is connected to the transverse plate.

12. The automated door system of claim 1, wherein:
the hinge pillar includes spaced-apart inner and outer sidewalls, each having at least one bolt-receiving opening extending therethrough, and a compression tube aligned with the bolt-receiving openings and having opposite ends abutting the inner and outer sidewalls;

an elongated bolt extending through an opening in a fixed base portion of the fixed hinge portion and through the bolt-receiving openings and through the compression tube, the elongated bolt having an outer end engaging the fixed base portion of the fixed hinge portion and an inner end connected to an instrument panel compensator joint whereby the elongated bolt secures the fixed hinge portion to the hinge pillar and simultaneously secures an instrument panel structure to the hinge pillar.

13. The automated door system of claim 12, wherein:
the hinge pillar has upper and lower ends, and the fixed hinge portion is secured to the upper end of the hinge pillar.

14. A motor vehicle comprising:
a body with at least one opening; and
an automated door system, comprising:
a door pivotally coupled to the body by upper and lower hinge assemblies to selectively open and close the opening of the body, the upper hinge assembly including a movable hinge portion having a base coupled to the door and a fixed hinge portion coupled to a hinge pillar of the body, wherein the movable hinge portion includes vertically aligned and spaced-apart upper and lower mounting portions, and wherein the upper mounting portion is rotatably connected to the fixed hinge portion for rotation about a hinge axis of the upper hinge assembly;

a power assist device coupled to the fixed hinge portion by a transverse connecting structure that is coupled to the fixed hinge portion by a fastener that extends parallel to the hinge axis such that a motor axis of the power assist device is rotatable about the fastener prior to tightening of the fastener, wherein the power assist device is further coupled to the lower mounting portion of the movable hinge portion by a drive shaft extending upwardly from the power assist device, wherein the drive shaft is rotationally fixed to the lower mounting portion of the movable hinge portion such that the drive shaft, the movable hinge portion, and the door are rotatable together; and a motor disposed within the power assist device and configured to drive the drive shaft for providing opening and closing movements of the door about the hinge axis of the upper hinge assembly.

15. The motor vehicle of claim 14, wherein:
the drive shaft extends through an opening in the lower mounting portion of the movable hinge portion and rotates about the motor axis that is generally coaxial with the hinge axis.

16. The motor vehicle of claim 14, wherein:
the upper mounting portion of the movable hinge portion is rotatably connected to the fixed hinge portion via a hinge pin that extends through an opening in the upper mounting portion of the movable hinge portion.

17. The motor vehicle of claim 14, wherein:
the base of the movable hinge portion comprises an upright web, and the upper and lower mounting portions extend transversely from the. upright web.

18. The motor vehicle of claim 14, wherein:
the connecting structure comprises a plate;
the drive shaft extends outwardly and upwardly from an upper end of the power assist device through an opening in the plate;
the plate extends transverse relative to the motor axis.

19. The motor vehicle of claim 14, wherein:
the fixed hinge portion includes a fixed base portion fixed to the hinge pillar of the body and vertically spaced-apart upper and lower connecting portions extending transversely from the fixed base portion, wherein the upper connecting portion of the fixed hinge portion is rotatably connected to the upper mounting portion of the movable hinge portion by a hinge pin, and the lower connecting portion of the fixed hinge portion is connected to the transverse connecting structure by the fastener.

20. A motor vehicle comprising:
a body with at least one opening;
and an automated door system, comprising:
a door pivotally coupled to the vehicle body by at least one hinge assembly, the hinge assembly including a movable hinge portion having a base coupled to the door and a fixed hinge portion having a fixed base portion coupled to a hinge pillar of the vehicle body, wherein the movable hinge portion includes vertically spaced-apart upper and lower mounting portions, and wherein the upper mounting portion is rotatably connected to the fixed hinge portion for-a rotation about a hinge axis of the hinge assembly;
a power assist device coupled to the fixed hinge portion and further coupled to the lower mounting portion of the movable hinge portion by a drive shaft extending outwardly from the power assist device;
a motor disposed within the power assist device and configured to drive the drive shaft for providing at least one of an opening and a closing movement of the door about the hinge axis of the hinge assembly;
wherein the hinge pillar includes spaced-apart inner and outer sidewalls, each having at least one bolt-receiving opening extending therethrough, and a compression tube aligned with the bolt-receiving openings and having opposite ends abutting the inner and outer sidewalls;
an elongated bolt extending through an opening in a fixed base portion of the fixed hinge portion and through the bolt-receiving openings and through the compression tube, the elongated bolt having an outer end engaging the fixed base portion of the fixed hinge portion and an inner end connected to an instrument panel compensator joint whereby the elongated bolt secures the fixed hinge portion to the hinge pillar and simultaneously secures an instrument panel structure to the hinge pillar.

* * * * *

UNITED STATES PATENT AND TRADEMARK OFFICE
CERTIFICATE OF CORRECTION

| | |
|---|---|
| PATENT NO. | : 11,365,578 B2 |
| APPLICATION NO. | : 16/555055 |
| DATED | : June 21, 2022 |
| INVENTOR(S) | : Bakos et al. |

It is certified that error appears in the above-identified patent and that said Letters Patent is hereby corrected as shown below:

In the Claims

Column 9:
Claim 17, Line 9;
After "the" delete ".".

Column 10:
Claim 20, Line 6;
"for-a rotation" should be --for rotation--.
Claim 20, Lines 20-21;
After "sidewalls;" insert --and--.
Claim 20, Line 22;
"a" should be --the--.

Signed and Sealed this
Thirtieth Day of August, 2022

*Katherine Kelly Vidal*
Katherine Kelly Vidal
*Director of the United States Patent and Trademark Office*